March 5, 1935.  E. F. M. DOUZIECH  1,993,653
LOAD BRAKE MECHANISM
Filed Sept. 27, 1933
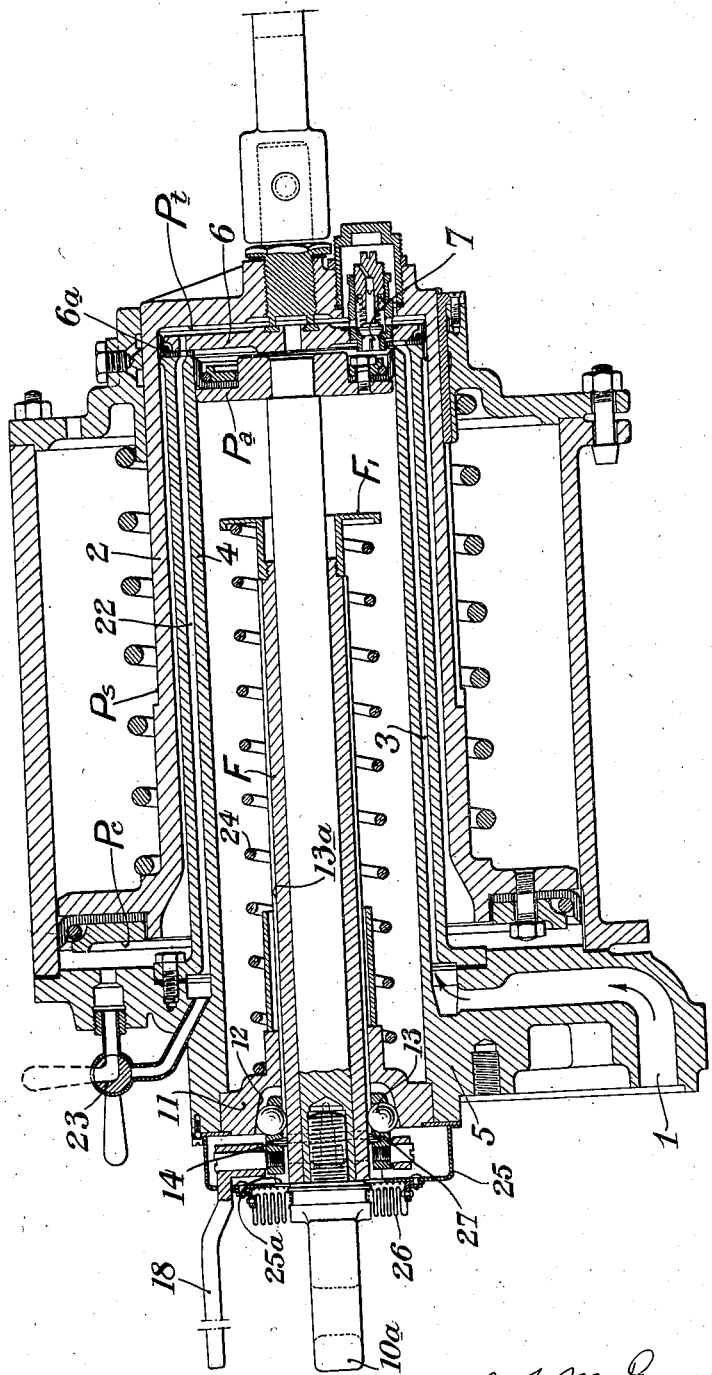

Patented Mar. 5, 1935

1,993,653

UNITED STATES PATENT OFFICE 1,993,653

LOAD BRAKE MECHANISM

Eugène Félix Marc Douziech, Paris, France, assignor to Société Des Freins Houplain, Paris, France Application September 27, 1933, Serial No. 691,232
In France October 4, 1932

2 Claims. (Cl. 303—23)

This invention relates to improvements in brake controls actuated by a driving fluid, and more particularly to those adapted to be used on goods-vans.

These improvements particularly relate to a device allowing to exert on the brake shoes a different brake-applying stress according as the van is empty or loaded, this stress being greater in the second case.

For that purpose, according to the invention, the device for admitting compressed air, or other fluid used as driving agent, under the brake-applying piston is so constructed that this fluid can be admitted at will, by a very simple operation (for instance by means of a cock), either under the entire surface of the piston when the van is loaded, or under a portion only of this surface when it is empty, the remainder of the surface being isolated and put for instance in communication with the atmosphere if the end of the brake cylinder opens in the atmosphere.

Braking is thus ensured, when running empty, in better conditions than with ordinary devices the cylinder charge of which is constant and always produces the brake-applying stress necessary for braking under load; in fact, the consumption of compressed air is smaller, and the risk of excessive braking blocking the wheels owing to their small adherence to the rails when the waggon is empty is avoided.

A form of carrying out the subject-matter of the invention will be described hereinafter, by way of example only, with reference to the accompanying drawing which is a longitudinal vertical section of the same.

It will be assumed that a device of the same type as that illustrated in Fig. 3 of the United States patent application filed on the 31st March 1932, under Ser. No. 602,289, is under consideration, in which device braking is ensured by the combination of two pistons, viz: on the one hand, an auxiliary piston Pa of small diameter, bringing the brake shoes in contact with the wheel rims and automatically adjusting the position of the pivot which serves as a fixed fulcrum for the brake rigging during application of the brakes, so as to take up the slack, and, on the other hand, a piston Ps, of large diameter, ensuring the application of the brakes.

According to the invention, the face of the piston Ps on which the action of compressed air is exerted is divided into a central portion Pt and a peripheral portion Pc which can be insulated from each other at will, so as to cause air to act either only under Pt when the waggon runs empty, or under the entire surface of the piston when it is loaded.

For that purpose, the bottom 6 of the auxiliary cylinder 4 is provided with a packing 6a which is fitted in a fluid-tight manner on the body 2 formed by the piston Ps and enclosing the cylinder 4, and which, in this way, separates Pt and Pc.

The communication between both these parts of the brake-applying piston is established through a conduit 22 formed in the bottom 6, the packing 6a and the wall of the cylinder 4, and which, on the one hand, opens in the dead space existing under Pt, and, on the other hand, communicates with the dead space existing under Pc through the medium of a three-way cock 23. This cock 23 normally occupies either the position shown in full lines, in which it cuts off the communication between 22 and Pc, and causes Pc to communicate with the atmosphere, or the position indicated by the dot and dash line in which it causes Pt and Pc to communicate.

The compressed air is admitted into the apparatus through the channel 1 and penetrates, through the channel 3, in the direction indicated by the arrows, under the auxiliary piston Pa which is thus so moved as to apply the brake shoes against the wheels. When the contact between the brake shoes and the wheels is established and the play in the brake rigging has been taken up, the air pressure under the said auxiliary piston increases and reaches such a value that the valve is lifted from its seat, so that the compressed air enters the space situated under the face Pt of the brake-applying piston Ps.

If the waggon is empty, the three-way cock 23 is moved to the position shown in full lines, in which any communication between the faces Pt and Pc of the piston Ps is cut off. The compressed air then only acts on the face Pt, the face Pc being in communication with the atmosphere through the channel of the three-way cock 23.

If the waggon is loaded, the three-way cock 23 is moved to the position shown in dot and dash lines. In this position, it establishes the communication between the spaces situated under the faces Pt and Pc of the piston Ps, so that the compressed air passes from the space situated under the face Pt, channel 22 and the channel of the cock 23, into the space situated under the face Pc and acts upon the entire active surface of the piston Ps.

Other detail arrangements have been provided in this apparatus for improving the conditions of operation of the sheath F and of the pawl and ratchet device 12—13 holding the piston Pa stationary after it has moved the fulcrum of the dead lever of the brake rigging to an extent corresponding to the taking up of the slack.

A returning spring 24, compressed between the bottom of the bowl 11 and a ledge F₁ of the sheath F, constantly urges the latter towards the right of the drawing and, concurrently with the pawl and ratchet device 12—13, holds it stationary, after each application of the brakes, in the position in which the piston Pa has moved it, thus positively avoiding any untimely displacement of the fulcrum of the dead lever of the brake rigging.

The pawl and ratchet device cooperating with the sheath F, as well as the control 18 allowing to put it out of action at will, are protected against shocks and against the introduction of foreign bodies which might scratch, warp or wedge them.

For that purpose, these parts are enclosed in a rigid protecting casing 25 secured on the bottom 5 of the apparatus and perforated, at the front, with a hole 25a for the passage of the rod 10a carrying the crosshead; this hole 25a is obturated in a fluid-tight manner by a bellows 26 secured, on the one hand, to the casing 25, on the other hand, to the rod 10a, and capable of becoming distorted so as to follow the movements of said rod.

The cage 14 carrying the balls 13 is finally provided with a lining 27 which surrounds the sheath, conforming to the shape of the latter, so as to push back the foreign bodies which may have entered the bearing portions 13a when the sheath F is moved back towards the right of the drawing, when effecting an adjustment, and to thus prevent these foreign bodies from wedging between the balls and their bearing portions.

It is to be understood that any suitable modifications can be made in the form of construction described above, without departing thereby from the scope of the invention; in particular, the device described is applicable to braking device of any other type; moreover, suitable modifications may be made in the device for distributing compressed air or other agent for transmitting the stress necessary for ensuring the braking action, in the device preventing said agent from acting on a portion of the surface of the brake-applying piston, etc.

I claim:

1. In a load brake mechanism for vehicles, the combination of an auxiliary cylinder of small diameter, an auxiliary piston in this cylinder, a no-load brake-applying cylinder with a no-load brake-applying piston, in the bottom of the small cylinder a spring valve adapted to open towards the interior of the no-load brake-applying cylinder under a definite pressure, a supplementary brake-applying cylinder with a supplementary brake-applying piston, rigid with the said no-load brake-applying piston, a piping extending from the bottom of the no-load brake-applying cylinder and opening into the said supplementary brake-applying cylinder, and means in this piping for establishing and cutting off the communication between the no-load brake-applying cylinder and the supplementary brake-applying cylinder.

2. In a load brake mechanism for vehicles, the combination of an auxiliary cylinder of small diameter, an auxiliary piston in this cylinder, a no-load brake-applying cylinder with a no-load brake-applying piston, in the bottom of the small cylinder a spring valve adapted to open towards the interior of the no-load brake-applying cylinder under a definite pressure, a supplementary brake-applying cylinder with a supplementary brake-applying piston, rigid with the said no-load brake-applying piston, a piping extending from the bottom of the no-load brake applying cylinder and opening into the said supplementary brake-applying cylinder, and in this piping a three-way cock, adapted to connect the supplementary brake-applying cylinder with the no-load brake-applying cylinder, in one of its positions, and with the atmosphere in another position.

EUGÈNE FÉLIX MARC DOUZIECH.